US009323918B2

(12) United States Patent
Shankaranarayanan et al.

(10) Patent No.: US 9,323,918 B2
(45) Date of Patent: *Apr. 26, 2016

(54) METHODS, SYSTEMS, AND COMPUTER PROGRAM PRODUCTS FOR RECOVERING A PASSWORD USING USER-SELECTED THIRD PARTY AUTHORIZATION

(71) Applicant: AT&T Intellectual Property I, L.P., Atlanta, GA (US)

(72) Inventors: Nemmara K. Shankaranarayanan, Bridgewater, NJ (US); William Roberts Cheswick, Bernardsville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,417

(22) Filed: Nov. 3, 2014

(65) Prior Publication Data

US 2015/0046986 A1    Feb. 12, 2015

Related U.S. Application Data

(63) Continuation of application No. 12/608,635, filed on Oct. 29, 2009, now Pat. No. 8,880,895.

(51) Int. Cl.
| | |
|---|---|
| *G06F 21/00* | (2013.01) |
| *H04L 9/32* | (2006.01) |
| *G06F 7/04* | (2006.01) |
| *G06F 21/45* | (2013.01) |
| *G06F 21/31* | (2013.01) |
| *H04L 29/06* | (2006.01) |

(52) U.S. Cl.
CPC .............. *G06F 21/45* (2013.01); *G06F 21/31* (2013.01); *G06F 2221/2131* (2013.01); *H04L 63/08* (2013.01); *H04L 63/102* (2013.01)

(58) Field of Classification Search
CPC ................. H04L 63/102; H04L 63/08; G06F 2221/2131; G06F 21/31
USPC .................................. 726/4, 6; 713/168, 184
See application file for complete search history.

(56) References Cited

U.S. PATENT DOCUMENTS

| 8,880,895 B2* | 11/2014 | Shankaranarayanan et al. ............... 713/184 |
|---|---|---|
| 2006/0126495 A1* | 6/2006 | Guichard et al. ............. 370/216 |
| 2009/0064297 A1* | 3/2009 | Selgas et al. ...................... 726/6 |
| 2009/0112985 A1* | 4/2009 | Quinn et al. .................. 709/204 |
| 2009/0241201 A1* | 9/2009 | Wootton et al. ................. 726/28 |
| 2009/0276833 A1* | 11/2009 | Paul et al. ......................... 726/4 |

* cited by examiner

*Primary Examiner* — Aravind Moorthy
(74) *Attorney, Agent, or Firm* — Scott P. Zimmerman, PLLC (57) ABSTRACT

A password recovery technique for access to a system includes receiving a request from a first party to recover the first party's password to access the system, receiving a selection of a second party from the first party, sending a message to the second party requesting that the second party authorize the request to recover the first party's password, receiving authorization from the second party for the request to recover the first party's password, and resetting the first party's password responsive to receiving authorization from the second party.

20 Claims, 6 Drawing Sheets

What is your favorite
food?

_______________

What is your
mother's maiden
name?

_______________

Submit

*FIG. 5*

Identify authorizer(s)
for password
recovery request

_______________ Name
_______________ Email
_______________ Phone
_______________ Name
_______________ Email
_______________ Phone ☐  John Doe ☐  Mary Doe Submit

METHODS, SYSTEMS, AND COMPUTER PROGRAM PRODUCTS FOR RECOVERING A PASSWORD USING USER-SELECTED THIRD PARTY AUTHORIZATION

RELATED APPLICATION

This application is a continuation of U.S. application Ser. No. 12/608,635 filed Oct. 29, 2009 and since issued as U.S. Pat. No. 8,880,895, the disclosure of which is incorporated herein by reference in its entirety.

BACKGROUND OF THE INVENTION

The present application relates generally to computer systems and networks, and, more particularly, to passwords for accessing computer systems and networks.

Almost all electronic systems that base access on the use of a userid and password use some type of backup authentication for password recovery when the user forgets his/her password. An automated method of password recovery, the so-called self-service password reset, is often used to improve convenience and reduce administrative cost. Frequently, a secondary password is used to reset the primary password.

Some methods that have been used to improve the security of password recovery are: 1) User-chosen security questions. This is a prevalent method of supplying secondary passwords and is based on one or more questions chosen in advance by the user (e.g., what is the name of your first pet?). The answers to these questions are often easier to guess than the primary password and, as a result, may reduce the security of the system to that of the secondary password. There have been numerous examples of malicious parties that have hacked email account passwords using this weakness as the secondary passwords can often be easily addressed by attackers. 2) Security questions based on information from public databases (e.g., past addresses). These questions generally suffer from the same weaknesses as user-chosen security questions can often be easily guessed by an attacker. 3) Sending password reset information to an email address on file. This approach uses another email account, which may not be available. Also, the email account generally needs to be equally as secure as the current system.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments, a password recovery method for access to a system comprises receiving a request from a first party to recover the first party's password to access the system, receiving a selection of a second party from the first party, sending a message to the second party requesting that the second party authorize the request to recover the first party's password, receiving authorization from the second party for the request to recover the first party's password, and resetting the first party's password responsive to receiving authorization from the second party.

In other embodiments, the method further comprises presenting the first party with at least one security question responsive to receiving the request from the first party to recover the first party's password and receiving a correct response to the at least one security question from the first party. Sending the message to the second party comprises sending the message to the second party responsive to receiving the correct response to the at least one security question from the first party.

In still other embodiments, the message to the second party is generated automatically without input from the first party.

In still other embodiments, sending the message to the second party comprises receiving content for the message from the first party and sending the content to the second party requesting that the second party authorize the request to recover the first party's password.

In still other embodiments, the content for the message comprises information that validates the identity of the first party to the second party.

In still other embodiments, the information that validates the identity of the first party comprises a pre-arranged code.

In still other embodiments, the second party has an account on the system and sending the message to the second party comprises presenting the second party with the message when the second party logs in to the system.

In still other embodiments, sending the message to the second party comprises sending the message to the second party via e-mail and/or text messaging.

In still other embodiments, the method further comprises presenting the first party with a plurality of parties to select from responsive to receiving the request from the first party to recover the first party's password and receiving the selection of the second party from the first party responsive to presenting the first party with the plurality of parties to select from. Sending the message to the second party comprises sending the message to the second party responsive to receiving the selection of the second party from the first party.

In still other embodiments, receiving the selection of the second party comprises receiving the selection of the second party and at least one other of the plurality of parties. Sending the message to the second party comprises sending the message to the second party and the at least one other of the plurality of parties requesting authorization of the request to recover the first party's password. Receiving authorization from the second party comprises receiving authorization from at least one of the second party and the at least one other of the plurality of parties for the request to recover the first party's password. And resetting the first party's password comprises resetting the first party's password responsive to receiving authorization from at least one of the second party and the at least one other of the plurality of parties.

In still other embodiments, resetting the first party's password comprises resetting the first party's password responsive to receiving authorization from the second party and the at least one other of the plurality of parties.

In still other embodiments, the method further comprises determining a time between sending the message to the second party and receiving authorization from the second party for the request to recover the first party's password. Resetting the first party's password comprises resetting the first party's password responsive to receiving authorization from the second party when the determined time between sending the message to the second party and receiving authorization from the second party is less than a threshold.

In further embodiments, a system comprises a processor that is configured to receive a request from a first party to recover the first party's password to access the system, to receive a selection of a second party from the first party, to send a message to the second party requesting that the second party authorize the request to recover the first party's password, to receive authorization from the second party for the request to recover the first party's password, and to reset the first party's password responsive to receiving authorization from the second party.

In still further embodiments, the processor is further configured to present the first party with at least one security question responsive to receiving the request from the first party to recover the first party's password, to receive a correct response to the at least one security question from the first party, and to send the message to the second party responsive to receiving the correct response to the at least one security question from the first party.

In still further embodiments, the message to the second party is generated automatically without input from the first party.

In still further embodiments, the processor is further configured to receive content for the message from the first party and to send sending the content to the second party requesting that the second party authorize the request to recover the first party's password.

In still other embodiments, a computer program product for recovering a password for accessing a system comprises a computer readable storage medium having computer readable program code embodied therein. The computer readable program code comprises computer readable program code configured to receive a request from a first party to recover the first party's password to access the system, computer readable program code configured to receive a selection of a second party from the first party, computer readable program code configured to send a message to the second party requesting that the second party authorize the request to recover the first party's password, computer readable program code configured to receive authorization from the second party for the request to recover the first party's password, and computer readable program code configured to reset the first party's password responsive to receiving authorization from the second party.

In still other embodiments, the computer program product further comprises computer readable program code configured to present the first party with at least one security question responsive to receiving the request from the first party to recover the first party's password and computer readable program code configured to receive a correct response to the at least one security question from the first party. The computer readable program code configured to send the message to the second party comprises computer readable program code configured to send the message to the second party responsive to receiving the correct response to the at least one security question from the first party.

In still other embodiments, the message to the second party is generated automatically without input from the first party.

In still other embodiments, the computer readable program code configured to send the message to the second party comprises computer readable program code configured to receive content for the message from the first party and computer readable program code configured to send the content to the second party requesting that the second party authorize the request to recover the first party's password.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

For purposes of illustration, some embodiments are described herein with respect to recovering a password used to gain access to a system. The system is not limited to any particular type of electronic device, but encompasses any data processing system that uses a password to grant/deny access to a user.

Some embodiments are based on the idea that the security of password recovery and self-service password reset can be improved by having another user, i.e., a third party, authorize or validate the password reset request. The other user or third party may be a friend who has been previously chosen by the user needing password recovery. By increasing the number of factors involved in authorizing or validating a password recovery request, system security can be improved.

Figure 1:
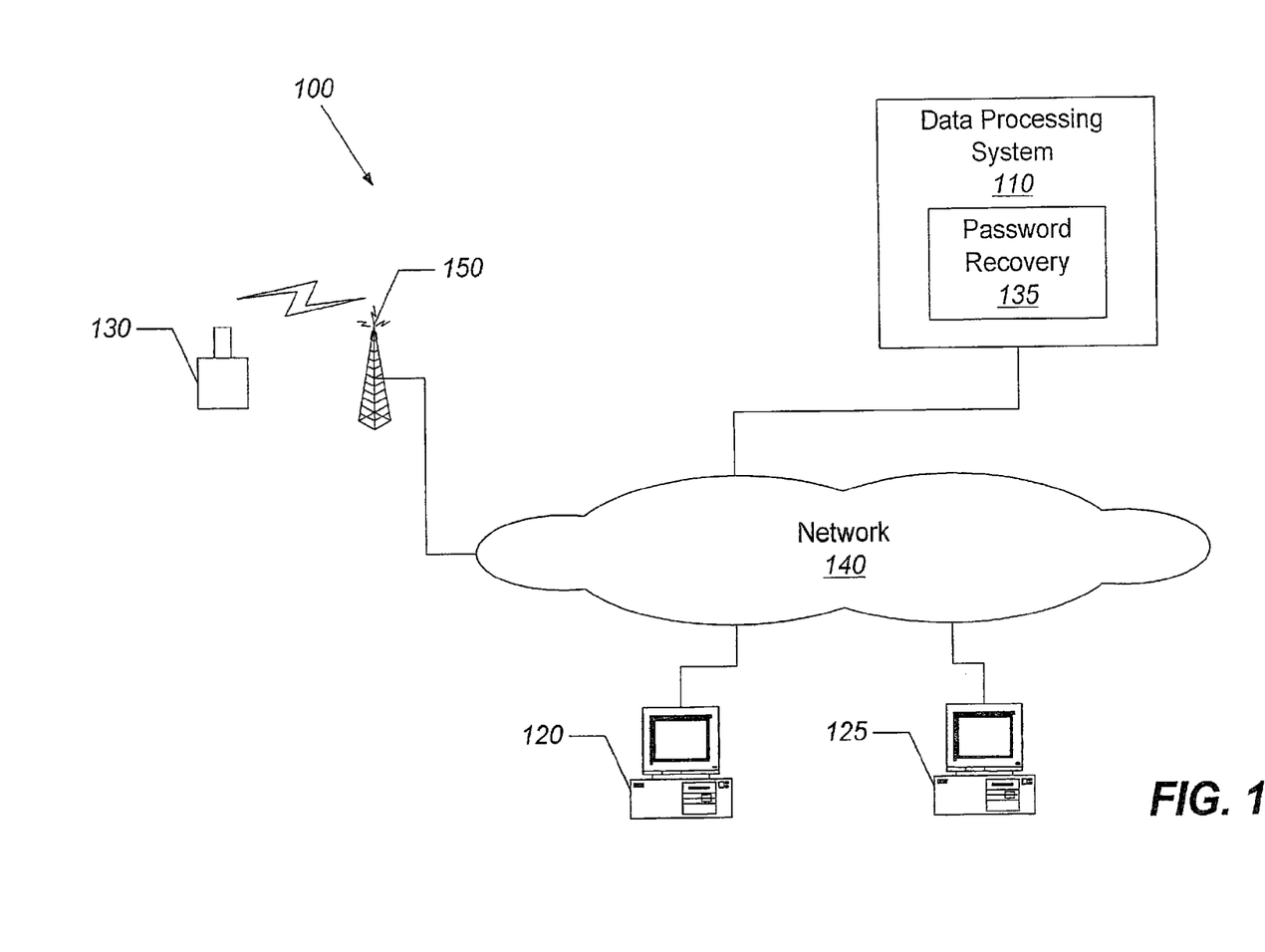
FIG. 1 is a block diagram that illustrates a communication network in accordance with some embodiments.

Referring now to FIG. 1, an exemplary network 100 that includes a data processing system with a password recovery capability, according to some embodiments, will now be described. The network 100 comprises a data processing system 110, which is accessed via various customer premises equipment (CPE), such as personal computers 120 and 125 and a wireless phone or mobile terminal 130. These various elements are connected to a network 140 as shown. The network 140 comprises a wireless base station transceiver 150 that may facilitate wireless communication with the wireless phone or mobile terminal 130. The network 140 may represent a global network, such as the Internet, or other publicly accessible network. The network 140 may also, however, represent a wide area network, a local area network, an Intranet, or other private network, which may not accessible by the general public. Furthermore, the network 140 may represent a combination of public and private networks or a virtual private network (VPN). Moreover, the password recovery embodiments are not limited to the type of CPE or device used to access the data processing system 110.

As used herein, the terms "wireless phone" or "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a conventional laptop; a palmtop receiver or other appliance that includes a radiotelephone transceiver; and/or a portable media player, such as a MP3 player, iPod, or the like. Wireless phones and or mobile terminals may also be referred to as "pervasive computing" devices.

The data processing system 110 is configured with a password recovery module 135 that is operable to involve a third party that is selected by a user to authorize or validate a password recovery request by the user. As will be described in detail below, a user of the computer 120 may forget his/her password for logging in to the data processing system 110. The user may select friends, such as the users of computer 125 and mobile terminal 130, who may authorize or validate a request by the user of computer 120 to reset his/her password on the data processing system 110. Using selected parties to authorize/validate a password recovery request may provide additional security when combined, for example, with conventional techniques based on a secondary password via security questions or sending password recovery information to an alternative user account.

Some embodiments can operate in a logically separated client side/server side-computing environment, sometimes referred to hereinafter as a client/server environment. As shown in FIG. 1, a user's personal computer 120 and/or mobile terminal 130, i.e., clients, may communicate with the data processing system 110, i.e., server, over a wireless and/or wireline communication medium in a client/server context. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser. The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are, sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 1 illustrates an exemplary communication network, it will be understood that the present invention is not limited to such configurations, but is intended to encompass any configuration capable of carrying out the operations described herein.

Figure 2:
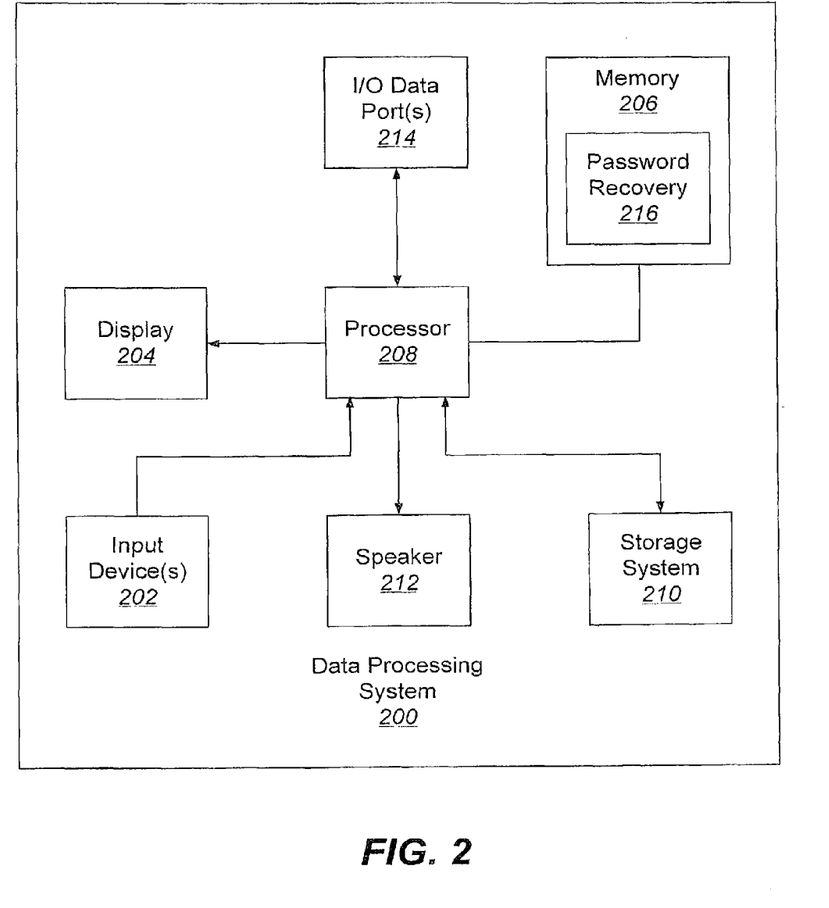
FIG. 2 illustrates a data processing system that may be used to implement the system of FIG. 1 that incorporates the password recovery capability in accordance with some embodiments.

Referring now to FIG. 2, a data processing system 200 that may be used to implement the data processing system of FIG. 1, in accordance with some embodiments, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a password recovery module 216 that may be used to facilitate the recovery a user's password by obtaining an authorization/validation of a user's password recovery request by one or more parties that have been selected by the user in accordance with some embodiments.

Figure 3:
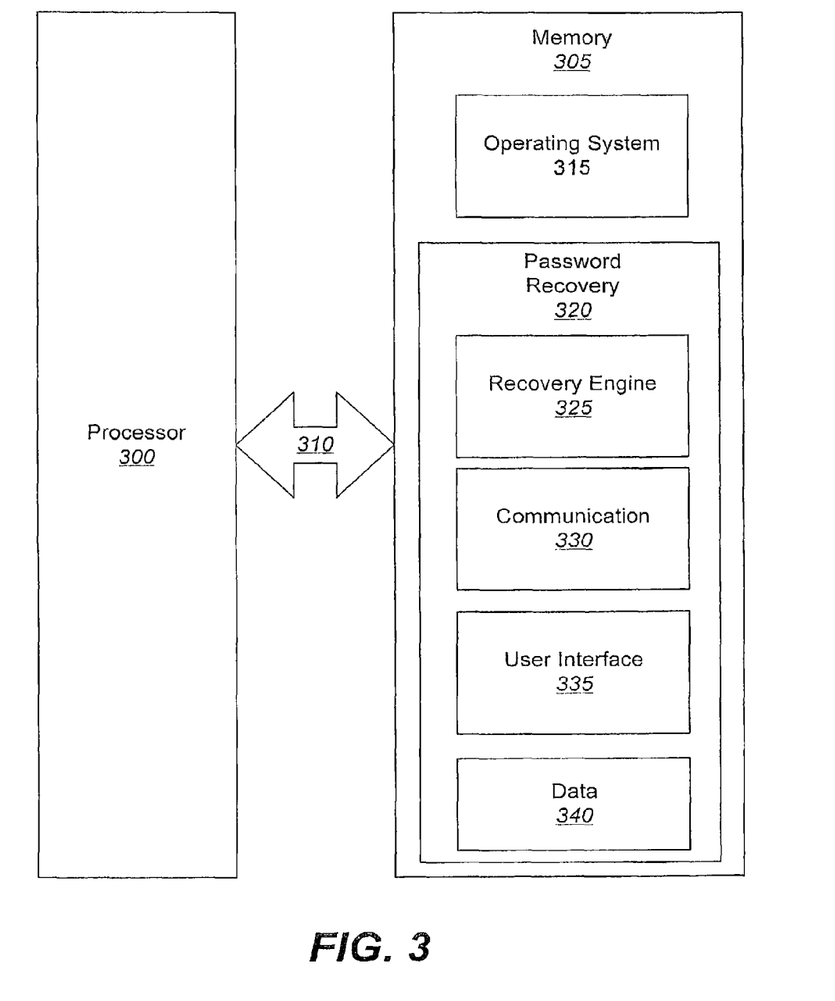
FIG. 3 is a block diagram that illustrates a software/hardware architecture for password recovery in accordance with some embodiments.

FIG. 3 illustrates a processor 300 and memory 305 that may be used in embodiments of data processing systems, such as the data processing systems 110 and 200 of FIGS. 1 and 2, respectively, in which a user may select one or more parties that provide authorization/validation for the user's password recovery request in accordance with some embodiments. The processor 300 communicates with the memory 305 via an address/data bus 310. The processor 300 may be, for example, a commercially available or custom microprocessor. The memory 305 is representative of the one or more memory devices containing the software and data used for user selected third party password authorization/validation in accordance with some embodiments. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a password recovery module 320. The operating system 315 generally controls the operation of the data processing system. In particular, the operating system 315 may manage the data processing system's software and/or hardware resources and may coordinate execution of programs by the processor 300. The password recovery module 320 may manage the recovery of a user's password in which one or more third parties are contacted for authorization/validation of a user's password recovery request. The password recovery module 320 comprises a recovery engine module 325, a communication module 330, a user interface module 335, and a data module 340.

The password recovery engine module 325 may manage the password recovery process and confirms that all of the security measures for recovering a user's password have been satisfied. The communication module 330 may facilitate communication with the user and the third party using mechanisms including, but not limited to, email, text messaging, Web forms, and the like. The user interface module 335 may provide various input screens for collecting information from a user, for example, when the user is submitting a password recovery request. The data module 340 may include all of the data involved in password recovery management including, but not limited to, password data, contact information for the users, contact information for one or more third parties selected by the users to authorize/validate password recovery requests, user-chosen security questions and answers thereto, and the like.

Although FIG. 3 illustrates exemplary hardware/software architectures that may be used in data processing systems, such as the data processing systems 110 and 200 of FIGS. 1 and 2, for password recovery involving user selected third party authorization/validation, it will be understood that the present invention is not limited to such a configuration but is intended to encompass any configuration capable of carrying out operations described herein. Moreover, the functionality of the data processing system 110 of FIG. 1, the data processing system 200 of FIG. 2, and the hardware/software architecture of FIG. 3 may be implemented as a single processor system, a multi-processor system, or even a network of stand-alone computer systems, in accordance with various embodiments.

Computer program code for carrying out operations of data processing systems discussed above with respect to FIG. 3 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Embodiments are described hereinafter with reference to flowchart and/or block diagram illustrations of methods, systems, client devices, and/or computer program products in accordance with some embodiments of the invention. These flowchart and/or block diagrams further illustrate exemplary operations of password recovery based on user selected third party authorization/validation in accordance with various embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
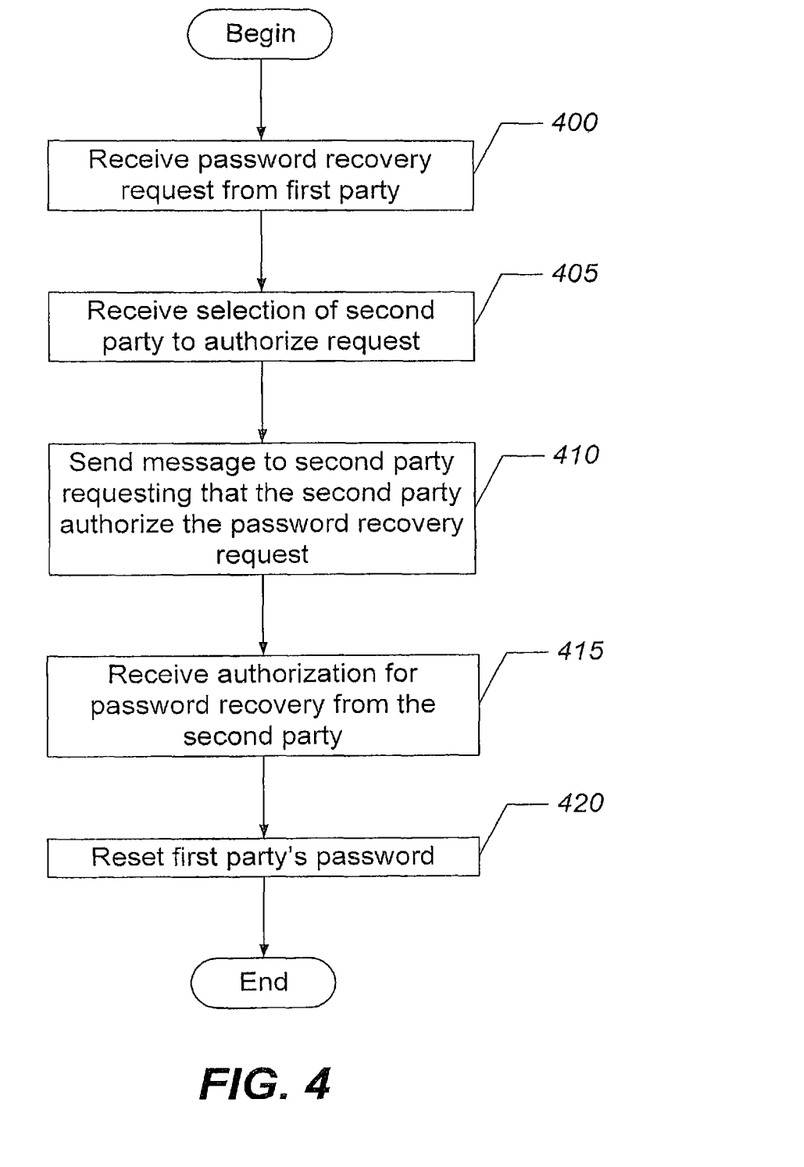
FIG. 4 is a flowchart that illustrates operations of methods, systems, and computer program for password recovery in accordance with some embodiments.
Figure 5:
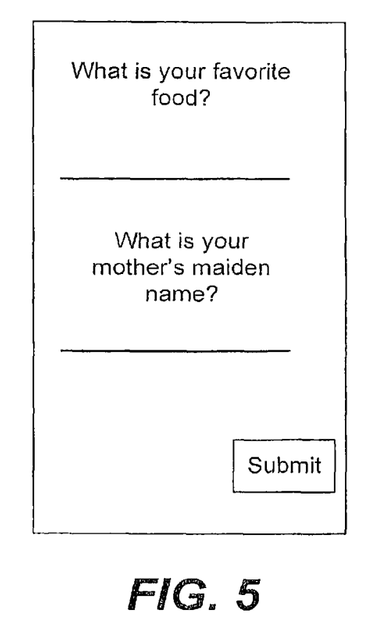
FIGS. 5-7 are block diagrams that illustrate various user interfaces for password recovery in accordance with some embodiments.
Figure 6:
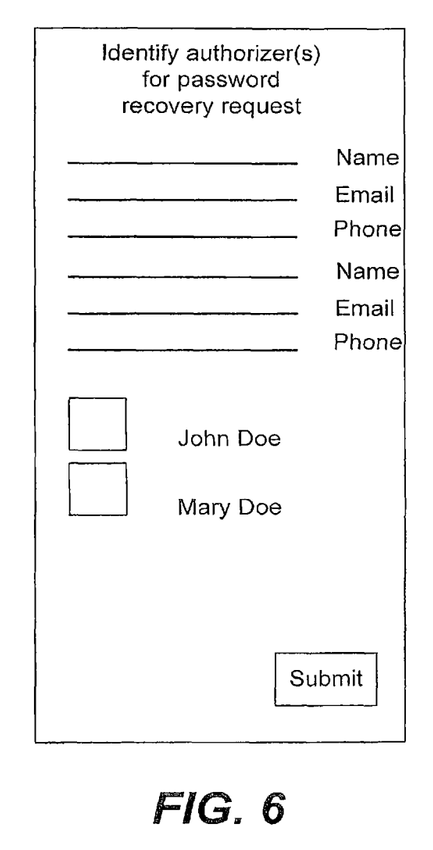
Figure 7:
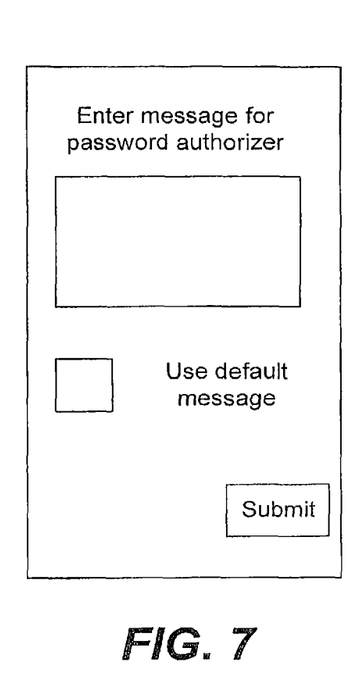

Operations for recovering a password based on user selected third party authorization/validation, in accordance with some embodiments, will now be described with reference to the flowchart of FIG. 4 and the user interface diagrams of FIGS. 5-7. Referring now to FIG. 4, operations begin at block 400 where a data processing system, such as the data processing systems 110 and 200 of FIGS. 1 and 2 receives a request from a user (e.g., first party) to recover his/her password. In some embodiments, a password recovery module, such as the password recovery modules 135, 216, and 320 shown in FIGS. 1-3 may present the user with one or more user-selected security questions, such as those shown in FIG. 5, to provide a first level of security.

At block 405 a user selects one or more people that can authorize or validate a user's password recovery request. This selection can be performed at any time, e.g., at the time the password recovery request is being made, when the user is selecting security questions, such as those shown in FIG. 5, or any other time convenient for the user. FIG. 6 illustrates an exemplary user interface for identifying one or more parties for authorizing/validating a user's password recovery request. As shown in FIG. 6, the user can type in the name and contact information for one or more people or the system may, for example, present one or more people from the user's email contact list as potential authorizers/validators. In accordance with various embodiments, multiple ones of these parties may be made active as an authorizer/validator or only a single party may be made active as an authorizer/validator.

Returning to FIG. 4, at block 410, the data processing system sends a message to one or more parties selected by the user with a request authorizing the recovery of the user's password. In accordance with some embodiments, the message may be sent only after the user successfully answers one or more security questions, such as those shown in FIG. 5. The message sent to the user-selected password recovery authorizers/validators may be an automated message generated by the data processing system or may be or may include a customized message generated by the user. As shown in FIG. 7, a user may be provided with an interface in which to compose a message to the person or persons that are requested to authorize/validate the password recovery request. To provide additional security, the user may include information in the message that validates the identity of the user to the authorizer/validator. Such information may include, for example, personal information that is private between the user and the authorizer/validator or even a pre-arranged code.

The message can be sent to the authorizers in a variety of ways including, but not limited to, e-mail, text messaging, Web posting, and the like. If an authorizer/validator has an account on the data processing system, then the authorizer/validator may receive the message upon logging in that he/she has a request to authorize/validate a password recovery operation for the user via a pop-up window or other mechanism for communicating system information during the login process.

Returning to FIG. 4, at block 415, the data processing system receives the authorization/validation from one or more parties selected by the user. Upon receiving the authorization/validation, the data processing system resets the user's password at block 420. In accordance with various embodiments, if the user selects multiple parties to authorize/validate a password recovery request, then the user may also require that all of the selected parties authorize/validate the recovery request before the user's password is reset or may only require that one of the multiple selected parties authorize/validate the recovery request before the user's password is reset. In this way, the user can increase security by requiring multiple authorizers/validators to approve a recovery request or the user may desire increased flexibility where any of a number of users can approve the recovery request. This may be useful if it is likely that many of the authorizers/validators may not be available and the user may include multiple parties to receive the password recovery request message with the hope that at least one will be available to approve the recovery.

In some embodiments, the data processing system may place a time threshold for receiving approval of the recovery request from the selected authorizer(s)/validator(s) for additional security. That is, if the selected party or parties do not transmit the authorization/validation for the password recovery request within a certain time limit, then the data processing system may deny the password recovery request and require, for example, intervention of an administrator before the password for the user's account is reset.

To improve the performance of the automated password recovery system embodiments, the user may frequently review his/her list of password authorizers/validators to ensure that the names on the list are names of people that can still be trusted and are generally available to respond to such requests.

The password recovery embodiments described herein may enhance system security over conventional approaches involving secondary passwords based on security questions. Moreover, the password recovery embodiments involving user selected third party authorization/validation may be combined with conventional approaches using security questions to increase the security of these conventional approaches. Such a combination may protect against attacks where a hacker, for example, has gained control over a selected authorizer's/validator's account. Furthermore, the password recovery embodiments described herein can be implemented without intervention by an administrator or customer representative.

The flowcharts of FIG. 4 illustrate the architecture, functionality, and operations of embodiments of methods, systems, and/or computer program products for recovering a password based on user-selected third party authorization/validation. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method, comprising:
receiving, by a server associated with a second party, an electronic request sent from a network address associated with a device, the electronic request requesting recovery of a password associated with a first party;
sending, by the server, a webpage to the network address associated with the device, the webpage for generating an interface for selecting a third party to authorize the recovery of the password, the interface comprising one of a field for entering an identity of the third party and a list that contains the identity of the third party;

receiving, by the server, a selection of the third party sent from the network address associated with the device, the selection input via the interface;

retrieving, by the server, a contact address associated with the third party;

sending, by the server, an electronic message to the contact address associated with the third party, the electronic message requesting that the third party authorize the recovery of the password associated with the first party;

receiving, by the server, authorization from the third party for the recovery of the password associated with the first party; and resetting, by the server, the password associated with the first party responsive to the authorization authorized by the third party.

2. The method of claim 1, further comprising:

presenting the first party with a security question responsive to receiving the electronic request to recover the password; and receiving a correct response to the security question from the first party.

3. The method of claim 1, further comprising generating the electronic message.

4. The method of claim 1, wherein sending the electronic message to the contact address associated with the third party comprises:

receiving content for the electronic message sent from the network address associated with the device; and sending the content to the contact address associated with the third party requesting that the third party authorize the recovery of the password.

5. The method of claim 4, further comprising receiving information that validates an identity of the first party to the third party.

6. The method of claim 5, further comprising receiving a pre-arranged code established between the first party and the third party that validates the identity of the first party.

7. The method of claim 1, further comprising:

retrieving an account associated with the third party; and sending a prompt to the contact address associated with the third party after a log in.

8. The method of claim 1, wherein sending the electronic message to the contact address associated with the third party comprises sending one of e-mail message and a text message.

9. The method of claim 1, further comprising retrieving multiple contact addresses, each one of the multiple contact addresses associated with a different third party authorized to recover the password associated with the first party.

10. The method of claim 9, further comprising:

selecting a different contact address from the multiple contact addresses, the different contact address associated with an additional third party authorizer; and sending the electronic message to the different contact address associated with the additional third party authorizer, the electronic message requesting that the additional third party authorizer approve the recovery of the password associated with the first party.

11. The method of claim 10, wherein resetting the password associated with the first party comprises resetting the password responsive to receiving the authorization from both the third party and the additional third party authorizer.

12. The method of claim 9, wherein retrieving the multiple contact addresses comprises retrieving an email contact list.

13. The method of claim 1, further comprising:

determining a time between sending the electronic message to the second party and receiving the authorization for the recovery of the password;

comparing the time to a threshold value; and resetting the password responsive to the time being less than the threshold value.

14. A system, comprising:

a processor; and a memory coupled to the processor, the memory storing code that when executed causes the processor to perform operations, the operations comprising:

receiving an electronic request sent from a network address associated with a device, the electronic request requesting recovery of a password associated with a first party;

sending a webpage to the network address associated with the device, the webpage for generating an interface for selecting a third party to authorize the recovery of the password, the interface comprising one of a field for entering an identity of the third party and a list that contains the identity of the third party;

receiving a selection of the third party sent from the network address associated with the device, the selection input via the interface;

retrieving a contact address associated with the third party;

sending an electronic message to the contact address associated with the third party, the electronic message requesting that the third party authorize the recovery of the password associated with the first party;

receiving an electronic authorization sent from the contact address associated with the third party, the electronic authorization authorizing the recovery of the password associated with the first party; and resetting the password associated with the first party responsive to the electronic authorization authorized by the third party.

15. The system of claim 14, wherein the operations further comprise:

sending a prompt to the network address associated with the device, the prompt presenting the first party with a security question to recover the password; and receiving a correct response to the security question sent from the network address.

16. The system of claim 14, wherein the operations further comprise generating the electronic message.

17. The system of claim 14, wherein the operations further comprise receiving a pre-arranged code established between the first party and the third party.

18. A computer program product memory device storing code that when executed causes a processor to perform operations, the operations comprising:

receiving an electronic request sent from a network address associated with a device, the electronic request requesting recovery of a password associated with a first party;

sending a webpage to the network address associated with the device, the webpage for generating an interface for selecting a third party to authorize the recovery of the password, the interface comprising one of a field for entering an identity of the third party and a list that contains the identity of the third party;

receiving a selection of the third party sent from the network address associated with the device, the selection input via the interface;

retrieving a contact address associated with the third party;

sending an electronic message to the contact address associated with the third party, the electronic message requesting that the third party authorize the recovery of the password associated with the first party;

receiving an electronic authorization sent from the contact address associated with the third party, the electronic authorization authorizing the recovery of the password associated with the first party; and resetting the password associated with the first party responsive to the electronic authorization authorized by the third party.

19. The memory device of claim 18, wherein the operations further comprise:

sending a prompt to the network address associated with the device, the prompt presenting the first party with a security question to recover the password; and receiving a correct response to the security question sent from the network address.

20. The memory device of claim 18, wherein the operations further comprise generating the electronic message.

* * * * *